(12) United States Patent
Patrick

(10) Patent No.: US 11,745,033 B2
(45) Date of Patent: Sep. 5, 2023

(54) PROCESS AND APPARATUS TO PRECLUDE UNFILTERED ATMOSPHERIC GASES AND HUMAN RESPIRATION PRODUCTS INCLUDING CARBON-DIOXIDE WITH CARBON-14 FROM ENTERING CONTROLLED GREENHOUSE ATMOSPHERIC GASES

(71) Applicant: Brett Patrick, Grants Pass, OR (US)

(72) Inventor: Brett Patrick, Grants Pass, OR (US)

( * ) Notice: Subject to any disclaimer, the term of this patent is extended or adjusted under 35 U.S.C. 154(b) by 758 days.

(21) Appl. No.: 16/813,555

(22) Filed: Mar. 9, 2020

(65) Prior Publication Data

US 2020/0289858 A1 Sep. 17, 2020

Related U.S. Application Data

(60) Provisional application No. 62/819,650, filed on Mar. 17, 2019.

(51) Int. Cl.
*A62B 7/00* (2006.01)
*A01G 9/24* (2006.01)
(Continued)

(52) U.S. Cl.
CPC ............... *A62B 7/00* (2013.01); *A01G 9/24* (2013.01); *A62B 7/12* (2013.01); *A62B 9/00* (2013.01);
(Continued)

(58) Field of Classification Search
CPC .. A62B 15/00; A62B 7/00; A62B 7/12; A62B 9/00; A62B 9/02; F24F 8/20;
(Continued)

(56) References Cited

U.S. PATENT DOCUMENTS

| | | | | | |
|---|---|---|---|---|---|
| 1,561,086 | A | * | 11/1925 | Korjibski | A62B 15/00 128/201.27 |
| 2,575,483 | A | * | 11/1951 | Erica | A62B 23/00 55/513 |

(Continued)

FOREIGN PATENT DOCUMENTS

| | | | | | |
|---|---|---|---|---|---|
| CA | 2727502 | A1 | * | 7/2012 | ............... A01G 9/14 |
| CN | 1572338 | A | * | 2/2005 | ............ A62B 15/00 |
| CN | 102232338 | A | * | 11/2011 | |

OTHER PUBLICATIONS

English translation for CN 1572338, translated by Search Clarivate Analytics, translated on Dec. 2, 2022.*

(Continued)

*Primary Examiner* — Tu A Vo
(74) *Attorney, Agent, or Firm* — Chernoff, Vilhauer, McClung & Stenzel, LLP

(57) ABSTRACT

A process and apparatus to preclude unfiltered atmospheric gases and the products of human respiration including carbon-dioxide ($CO_2$) with carbon-14 ($_{14}C$) from contaminating greenhouse atmospheric gases which has utility in growing agricultural products with a reduced abundance of $_{14}C$ are disclosed. Agricultural products with reduced $_{14}C$ content can be grown in greenhouses with filtered atmospheric gases for the benefit of reducing harmful damage to human DNA. Agricultural production in greenhouses still requires humans to plant, maintain, and harvest crops in many cases. The process and apparatus allow for humans to access, work, and operate in these controlled environments without contaminating the atmospheric gases and agricultural products therein with respiration products and unfiltered atmospheric gases containing radioactive $_{14}C$.

11 Claims, 1 Drawing Sheet

(51) Int. Cl.
*A62B 9/02* (2006.01)
*A62B 7/12* (2006.01)
*F24F 8/20* (2021.01)
*A62B 9/00* (2006.01)

(52) U.S. Cl.
CPC .............. *A62B 9/02* (2013.01); *F24F 8/20* (2021.01); *F24F 2221/38* (2013.01)

(58) Field of Classification Search
CPC ....... F24F 2221/38; A01G 9/24; A01G 9/246; A01G 9/241
See application file for complete search history.

(56) References Cited

U.S. PATENT DOCUMENTS

| | | | | |
|---|---|---|---|---|
| 4,380,187 | A * | 4/1983 | Wicks | A62B 15/00 454/342 |
| 4,413,622 | A * | 11/1983 | Austin | A62B 7/00 128/202.13 |
| 4,510,930 | A * | 4/1985 | Garcia | A62B 15/00 128/205.24 |
| 5,251,457 | A * | 10/1993 | Chen | A62B 17/00 165/46 |
| 5,398,678 | A * | 3/1995 | Gamow | A61G 10/026 128/205.26 |
| 5,531,220 | A * | 7/1996 | Cassidy | B64D 13/08 128/205.12 |
| 5,956,896 | A | 9/1999 | Miekka et al. | |
| 6,131,571 | A | 10/2000 | Lampotang et al. | |
| 8,627,821 | B2 | 1/2014 | Edwards et al. | |
| 8,776,796 | B2 | 7/2014 | Nolan | |
| 9,901,703 | B2 | 2/2018 | Barnes et al. | |
| 10,034,994 | B2 | 7/2018 | McAuley et al. | |
| 10,166,360 | B2 | 1/2019 | Thomas et al. | |
| 10,173,082 | B2 | 1/2019 | Lewin et al. | |
| 10,179,221 | B2 | 1/2019 | Wruck | |
| 10,201,676 | B2 | 2/2019 | Lithgow et al. | |
| 2006/0258279 | A1 * | 11/2006 | Bonnard | A61L 2/26 454/55 |
| 2007/0101867 | A1 * | 5/2007 | Hunter | A62B 23/02 96/224 |
| 2009/0217930 | A1 * | 9/2009 | Holley | A61G 10/026 52/80.1 |
| 2012/0040600 | A1 * | 2/2012 | Ortner | F24F 3/167 2/456 |
| 2012/0165490 | A1 * | 6/2012 | Lindell | C12P 7/26 435/157 |
| 2014/0259995 | A1 * | 9/2014 | White | E04H 9/16 52/173.1 |
| 2015/0025300 | A1 * | 1/2015 | Hill | A61L 9/22 600/21 |
| 2019/0110451 | A1 * | 4/2019 | Wu | A01K 67/033 |
| 2019/0234631 | A1 * | 8/2019 | Wallace | B01L 1/04 |

OTHER PUBLICATIONS

English translation for CN 1572338, translated by Google patent, translated on Dec. 3, 2022.*
English translation for CN 102232338, translated by Search Clarivate Analytics, translated on Apr. 21, 2023.*
Genome Reference Consortium (GRC) Human Genome Assembly build 38 (GRCh38), Dec. 24, 2013.
Lander, E. S. et al., Initial sequencing and analysis of the human genome. Nature 409, 860-921 (2001).
Patrick, A. D., & Patrick, B. E., Carbon 14 decay as a source of somatic point mutations in genes correlated with cancer diagnoses, Stable Isotope Foundation, Grants Pass, Oregon, USA (2017).
Purdom, C. E., Biological hazards of carbon-14, New Sci. 298, 255-257 (1962).
Sassi, M., et al., Carbon-14 decay as a source of non-canonical bases in DNA, Biochimica et Biophysica Acta 1840 526-534 (2014).
Sender, R., Fuchs, S., & Milo, R., Revised estimates for the number of human and bacteria cells in the body, PLoS Biol 14(8): e1002533 (2016).

* cited by examiner

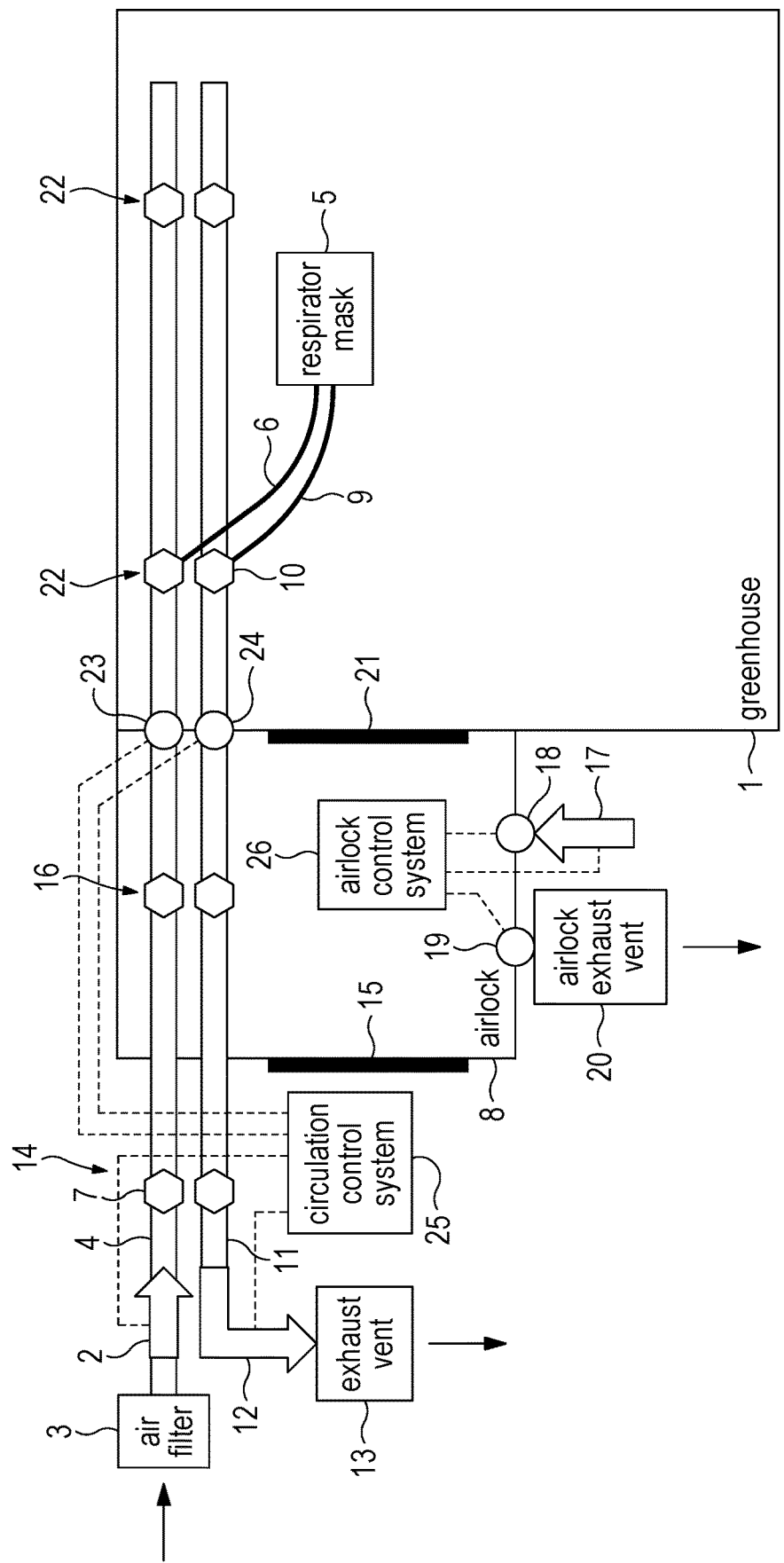

PROCESS AND APPARATUS TO PRECLUDE UNFILTERED ATMOSPHERIC GASES AND HUMAN RESPIRATION PRODUCTS INCLUDING CARBON-DIOXIDE WITH CARBON-14 FROM ENTERING CONTROLLED GREENHOUSE ATMOSPHERIC GASES

CROSS REFERENCE TO RELATED APPLICATIONS

Application Ser. No. 16/030,734 Filing Date: Jul. 9, 2018.

FEDERALLY SPONSORED RESEARCH

None.

SEQUENCE LISTING OR PROGRAM

None

BACKGROUND

This invention relates to a process and apparatus to preclude unfiltered atmospheric gases and the products of human respiration including carbon-dioxide ($CO_2$) with carbon-14 ($^{14}C$) from contaminating greenhouse atmospheric gases which has utility in growing agricultural products with a reduced abundance of $^{14}C$. Agricultural products with reduced radioactive $^{14}C$ content can be grown in controlled environments such as a greenhouse for the benefit of reducing harmful damage to human DNA that is unavoidable with our current food chain, due to the natural abundance of $^{14}C$ in atmospheric gases. Radioactive $^{14}C$ decay to nitrogen-14 with the release of 156 KeV has long been known to have biological effects (Purdom, C. E.). Sequencing of the human genome has identified 6.1 billion base pairs in human DNA, with 119 billion carbon atoms in the DNA of each nucleated cell (Lander, E. S., and Genome Reference Consortium (GRC) Human Genome Assembly build 38 (GRCh38)). Recent quantitative analysis of human tissues has estimated 3 trillion nucleated cells in the human body (Sender, R., Fuchs, S., & Milo, R.). Given the natural abundance and half-life of $^{14}C$ and composition of our genome (i.e., a mean of roughly $6.0\times10^9$ base pairs with 19.5 carbon atoms each), in the average human this decay is occurring once per second in human DNA, resulting in potential bond ruptures, DNA strand breakage, and nitrogen substitution in canonical bases (Sassi, M., et. al.). This cumulative damage has been positively correlated to cancer diagnoses (Patrick, A. D., & Patrick, B. E.), and may have other yet-to-be-quantified effects on human tissues as we age. In fact, no mammal has yet lived without this cumulative damage, so the qualitative benefits of precluding this genetic alteration are yet-to-be-quantified. To preclude this cumulative damage and genetic alteration, it is necessary to perform isotope separation on large volumes of atmospheric gases to remove $^{14}C$ from agricultural products and their derivatives in the food chain. This requires an economical means for the filtration of atmospheric gases and the growth, maintenance, and harvesting of agricultural products in controlled environments, such as greenhouses, as well as a means for humans to work in and maintain these environments without contaminating the atmospheric gases and agricultural products therein with respiration products containing radioactive $^{14}C$.

BACKGROUND-PRIOR ART

In commercial applications, control of the inflow and outflow of human respiratory gases has most commonly been applied in therapeutic applications, such as with Continuous Positive Airway Pressure (CPAP) masks, or to limit particulate contamination in cleanrooms. To-date, respiratory masks and processes to control the inflow and outlet of gases from human respiration have not been utilized for greenhouse applications. Greenhouses differ from cleanrooms because they are full of organic compounds, debris, and particulates resulting from emissions from agricultural products, materials, and organic processes. In the case of agricultural production in greenhouses with the filtration of atmospheric gases to preclude $^{14}C$ contamination, any human respiration in such controlled environments would currently result in contamination of said controlled environment and products. The removal of $CO_2$ with $^{14}C$ in human respiration products from humans in greenhouse atmospheric gases has not been demonstrated in prior art.

McAuley, et. al, in U.S. Pat. No. 10,034,994, shows that a mask can be used to provide a CPAP to humans with a diffused outlet of gases into the ambient air. The diffused outlet of gases likely is beneficial in therapeutic applications for reducing the sound produced by the airflow, but in our desired application, this diffusion would contaminate the controlled environment with respiratory products containing $^{14}C$.

Edwards, et. al., in U.S. Pat. No. 8,627,821, shows that diagnostic device for measuring particulate production from respiration in cleanroom environments. The use of a particle counter to measure human respiration products has utility for cleanroom applications, but this patent has no ability to measure the presence of radioactive $^{14}C$ in $CO_2$ which would be measured as a normal atmospheric gas rather than a particulate contamination. The accurate measurement of $^{14}C$ in the $CO_2$ of human respiration products remains an unresolved technical challenge this invention is not addressing, as it would require an atomic mass spectrometer and a sufficient sample size for accurate measurement.

Lewin, et. al., in U.S. Pat. No. 10,173,082, demonstrates a combined exhale and inlet valve for a respirator. While this invention is useful for limiting the assemblies connecting to a mask worn by a respirating human, this is unrelated to the environment a mask may be worn within or any contaminants that may be passing in or out of the mask.

Wruck, Norbert, in U.S. Pat. No. 10,179,221, demonstrates a device and method for providing a stream of gases for respiration that contain therapeutically active substances. While this is useful in therapeutic applications, this is unrelated to agricultural production in greenhouses, and has provides no control over the outflow of gases or contamination of the environment the outflow is diffused into.

Lithgow, et. al, in U.S. Pat. No. 10,201,676, shows a device that can provide a breathable gas supply for therapeutic purposes. Again, while this is useful for therapeutic applications, this is unrelated to agricultural production in greenhouses, and has provides no control over the outflow of gases or contamination of the environment the outflow is diffused into.

Thomas, et. al., in U.S. Pat. No. 10,166,360, shows a system and method for controlling gas flow during exhalation to detect occurrences of disordered breathing events. Again, while this is useful for therapeutic applications, this is unrelated to agricultural production in greenhouses.

Barnes, et. al., in U.S. Pat. No. 9,901,703, shows a system provide mask pressure regulation to assist respiration to pressurize a mask and maintain a sustainable constant airflow in a mask. While this is useful for maintaining comfortable respiration for humans, it is independent of agricultural production in greenhouses or the subsequent contamination of environments from respiration products.

Nolan, Clay, in U.S. Pat. No. 8,776,796, shows a method for improving assisted ventilation for medical patients with devices position in the trachea or esophagus. While this is useful in medical circumstances, it is independent of agricultural production in greenhouses or useful in the removal of $^{14}C$ contaminated $CO_2$ products of human respiration.

Lampotang, et al, in U.S. Pat. No. 6,131,571, shows an apparatus and system for ventilation and the delivery of anesthesia for therapeutic purposes enabling the delivery of clinical gases with a positive and negative pressure loop. This is useful in medical circumstances where the interface to the patient is critical, such as a variable size orifice or endotracheal tube, as well as alternating pressures to inflate and deflate a patient's lungs to assist respiration. Like other pneumatically assisted ventilators, this is very useful in medical situations, but not useful for agricultural production in greenhouses that require the removal of contaminants in human respiration products.

Miekka, et. al., in U.S. Pat. No. 5,956,896, shows a method for growing plants in a controlled environment with a lower than natural abundance of $^{14}C$. While this identifies an essential method for the production of agricultural products with a lower than natural abundance of $^{14}C$, it does not provide a means for humans to access or operate in such environments for either the maintenance of equipment used to grow plants or for the harvesting of agricultural products from such environments.

In conclusion, no method or process has been formerly developed for precluding the contamination of greenhouses with human respiration products including $CO_2$ with $^{14}C$. Similarly, no apparatus or systems have been formerly developed with the specific intent to efficiently and economically preclude $CO_2$ with $^{14}C$ as a product of human respiration from entering the atmospheric gases of greenhouses.

SUMMARY

A process to grow agricultural products with a reduced abundance of radioactive $^{14}C$ will have health benefits by reducing harmful damage to human DNA, which has been correlated to cancer. Other benefits of reduced cumulative genetic damage over long periods of time have yet to be quantified. To-date, removal of $^{14}C$ from agricultural products on has been complicated by a lack of a means for humans to respire in greenhouses with controlled atmospheric gases without contaminating said gases with respiration products containing $CO_2$ with $^{14}C$. An airlock provides for the filtration of atmospheric gases that can enter a greenhouse while a respiratory mask with air supply and return systems, including valves, blowers, solenoids, and vents can enable one or more humans to respire within a greenhouse without contaminating the gases or agricultural products therein with $CO_2$ containing $^{14}C$. This is unlike typical applications, since normally additional $CO_2$ would be desired in greenhouse environment because it is food for plants. However, unfiltered atmospheric gases and respiration products from humans eating food chain products from natural atmospheric gases would constitute a source of contamination for this application. This is also unlike typical applications because rather than only being focused on the essential supply of fresh air for human respiration, with disregard for general destination of the respiration products, this application is equally concerned about removing respiration products from the greenhouse to prevent contamination of the agricultural products. Entry into the greenhouse of a human without the surrounding respiratory products is also a factor, and valves are utilized to provide air supply and returns within an airlock connected to the greenhouse to enable the venting of gases prior to entry and the replacement of those gases with filtered gases lacking $CO_2$ with $^{14}C$. The ability to directly filter atmospheric gases to remove CO2 with $^{14}C$ is outside the scope of this invention, but this ability is needed to provide a supply of atmospheric gases for both the greenhouse and the airlock prior to entry to the greenhouse. This invention provides an efficient and economical means to enable the filtration of atmospheric gases that can enter a greenhouse through an airlock and for human respiration inside a greenhouse intended to grow agricultural products with low 14C content without contamination of said products with respiration products containing $CO_2$ with $^{14}C$.

DRAWINGS-FIGURES

FIG. 1 is a System Diagram for Precluding Unfiltered Atmospheric Gases and Human Respiration Products Including $CO_2$ with $^{14}C$ from Entering Greenhouse Atmospheric Gases.

DETAILED DESCRIPTION

FIG. 1. is a system diagram for precluding unfiltered atmospheric gases and human respiration products including $CO_2$ with $^{14}C$ from entering greenhouse 1 atmospheric gases in accordance with the process designs and claims within the invention. An air blower 2 pulls atmospheric gases through an air filter 3 and into the air supply line 4 at a rate between 2.2 and 2.6 cubic feet per minute for each human respirator mask 5. This fresh air supply can be accessed for respiration by connecting a flexible air supply tube 6 to an air supply valve 7 which may be located outside, in the airlock 8, or within 1 at optionally a plurality of locations to support a plurality of either work sites or workers with 5 simultaneously. After human respiration, the exhaled respiration products are vented out of 5 into the flexible air return tube 9, through an air return valve 10, and into the air return line 11. The respiration products are then either pushed out by air pressure created by 2 or vented out with the assistance of an optional vent blower 12 and exits through an exhaust vent 13 into atmospheric gases. The respiring human wearing 5 may connect to outside vents 14 to test the systems before opening the airlock door 15 and entering 8. After entering 8 and connecting 6 and 9 to the airlock valves 16, 15 is closed and the airlock blower 17 is activated, providing filtered atmospheric gases lacking $CO_2$ with $^{14}C$ (see related patent application Ser. No. 16/030,734), while the inflow control valve 18 and outflow control vent 19 are opened, and 17 vents any human respiratory products in 8 out through the airlock exhaust vent 20. After the air in 8 is evacuated, the user opens the greenhouse door 21 and connects 6 and 9 to 7 and 10 in 1, also labeled as greenhouse valves 22 which may be singular or plural depending on the needs to service 1. After connecting to 22, 21 may be closed. Finally, normally closed air supply solenoid valve 23 in 4 and an air return solenoid valve 24 in 11 can be used to prevent any valve leaks at 7 or 10 from causing gases to either enter or exit 1 unintentionally.

DRAWINGS—REFERENCE NUMERALS 1 greenhouse
2 air blower
3 air filter
4 air supply line
5 respirator mask
6 flexible air supply tube
7 air supply valve
8 airlock
9 flexible air return tube
10 air return valve
11 air return line
12 vent blower
13 exhaust vent
14 outside valves
15 airlock door
16 airlock valves
17 airlock blower
18 airlock inflow control valve
19 airlock outflow control valve
20 airlock exhaust vent
21 greenhouse door
22 greenhouse valves
23 air supply solenoid valve
24 air return solenoid valve
25 circulation control system
26 airlock control system.

OPERATION

The operation for precluding $CO_2$ with $^{14}C$ in human respiration products and unfiltered atmospheric gases from entering the atmospheric gases in a greenhouse 1 for growing agricultural products with reduced $^{14}C$ content.

1. An air supply system comprising an air blower 2 which pulls air through an air filter 3 and into an air supply line 4 which has a plurality of air supply valves 7. A normally closed air supply solenoid valve 23 is activated to enable airflow during operation and to minimize 7 leaks when not in operation.

2. An air return system comprising air return valves 10, an air return line 11, a vent blower 12, and an exhaust vent 13. A normally closed air return solenoid valve is activated to enable airflow during operation and to minimize 10 leaks when not in operation.

3. A mask assembly consisting of a respiration mask 5, flexible air supply tube 6, and flexible air return tube 9, can be attached to 7 and 10 either outside 14, in the airlock 16, or in the greenhouse 22.

4. A circulation control system 25 has a switch that when activated provides power to 2, 12, 23, and 24, and constitutes a means to circulate gases for human respiration from outside said greenhouse into said respiration mask, and return respiration products to outside.

5. An airlock 8 provides controlled access through an airlock door 15 and a greenhouse door 21, which are not open at the same time. An airlock control system 26 has a switch that when activated provides power to Control valves 18, 19, and the airlock blower 17, which provides filtered air absent $CO_2$ with $^{14}C$ into the airlock (see related patent application Ser. No. 16/030,734). 26 is used with a timing circuit so that it replaces the air in the airlock every time it is activated, and constitutes a means for gases in the airlock to be evacuated by simultaneously turning on said airlock blower and opening said air inflow control valve and air outflow control valve.

6. Entering the greenhouse: while outside the greenhouse, the human user turns on 25, connects 9 and 6 to 10 and 7 at 14, and then utilizes 5 for respiration. After respiration is confirmed as satisfactory, then the user opens 15 and disconnects 6 and 9 from 14 and reconnects at 16. Then 15 is closed and 26 is activated. After the airlock has been evacuated and respiration is confirmed as satisfactory, then the user opens 21 and disconnects 6 and 9 from 16 and reconnects at 22, and closes 21.

7. Exiting the greenhouse: while inside the greenhouse, the human user opens 21, disconnects 6 and 9 from 22, and reconnects at 16 in 8.

After respiration is confirmed as satisfactory, 21 is closed, then 15 is opened. To protect 1 from leaks from 8, 26 is activated. After disconnecting from 16, the user exits 8, closes 15, and removes 5.

REFERENCES CITED

U.S. PATENT DOCUMENTS

| | | | |
|---|---|---|---|
| 10,201,676 | February 2019 | Lithgow, et. al. | 1/1 |
| 10,179,221 | January 2019 | Wruck, et. al. | 1/1 |
| 10,173,082 | January 2019 | Lewin, et. al. | 1/1 |
| 10,166,360 | January 2019 | Thomas, et. al. | 1/1 |
| 10,034,994 | July 2018 | McAuley, et. al. | 1/1 |
| 9,901,703 | February 2018 | Barnes, et. al. | 1/1 |
| 8,627,821 | January 2014 | Edwards, et. al. | 128/205.22 |
| 6,131,571 | April 1997 | Lampotang, et. al. | 128/204.21 |
| 5,956,896 | September 1999 | Miekka, et. al. | 47/58.1R |

OTHER PUBLICATIONS

Genome Reference Consortium (GRC) Human Genome Assembly build 38 (GRCh38), 24 Dec. 2013.

Lander, E. S. et al., Initial sequencing and analysis of the human genome, Nature 409, 860-921 (2001).

Patrick, A. D., & Patrick, B. E., Carbon 14 decay as a source of somatic point mutations in genes correlated with cancer diagnoses, Stable Isotope Foundation, Grants Pass, Oreg., USA (2017).

Purdom, C. E., Biological hazards of carbon-14, New Sci. 298, 255-257 (1962).

Sassi, M., et. al., Carbon-14 decay as a source of non-canonical bases in DNA, Biochimica et Biophysica Acta 1840-526-534 (2014).

Sender, R., Fuchs, S., & Milo, R., Revised estimates for the number of human and bacteria cells in the body, PLoS Biol 14(8): e1002533 (2016).

I claim:

1. An apparatus for precluding atmospheric gases and products of human respiration from contaminating the gases in a greenhouse, comprising:

(a) an airlock connected to said greenhouse;
(b) an airlock door connected to said airlock;
(c) a greenhouse door connected to said greenhouse inside of said airlock;
(d) an air inflow control valve connected to said airlock;
(e) an air outflow control valve connected to said airlock;
(f) an airlock blower connected to said air inflow control valve;
(g) an air supply line for supplying air to the airlock and the greenhouse;
(h) an air return line for removing air from the airlock and greenhouse;

(i) at least one air supply valve connected to said air supply line, the at least one air supply valve being provided in said airlock;

(j) at least one air return valve connected to said air return line, the at least one air return valve being provided in said airlock;

(k) means for simultaneously turning on said airlock blower and opening said air inflow control valve and said air outflow control valve to evacuate gases in the airlock; and a respiration mask selectively connectable to said at least one air supply valve and said at least one air return valve.

2. The apparatus of claim 1, further comprising:
a flexible air supply tube connected to said respiration mask and connectable to said at least one air supply valve; and
a flexible air return tube connected to said respiration mask and connectable to said at least one air return valve.

3. The apparatus of claim 1, wherein said at least one air supply valve includes a first air supply valve disposed within said airlock and outside said greenhouse and a second air supply valve disposed within said greenhouse, and wherein said at least one air return valve includes a first air return valve disposed within said airlock and outside said greenhouse and a second air return valve disposed within said greenhouse.

4. The apparatus of claim 3, further comprising:
a flexible air supply tube connected to said respiration mask and connectable to one of said first or second air supply valves; and
a flexible air return tube connected to said respiration mask and connectable to one of said first or second air return valves.

5. The apparatus of claim 3, wherein said at least one air supply valve further includes a third air supply valve disposed external said airlock and said greenhouse, wherein said at least one air return valve further includes a third air return valve disposed external said airlock and said greenhouse.

6. The apparatus of claim 5, further comprising:
a flexible air supply tube connected to said respiration mask and connectable to one of said first, second, or third air supply valves; and
a flexible air return tube connected to said respiration mask and connectable to one of said first, second, or third air return valves.

7. An apparatus for precluding atmospheric gases and products of human respiration from contaminating the gases in a greenhouse, comprising:
(a) an airlock connected to said greenhouse;
(b) an airlock door connected to said airlock;
(c) a greenhouse door connected to said greenhouse inside of said airlock;
(d) means for gases in the airlock to be evacuated;
(e) an air supply line for supplying air to the airlock and greenhouse;
(f) a first air supply valve connected to said air supply line and disposed within said airlock and outside said greenhouse;
(g) a second air supply valve connected to said air supply line and disposed within said greenhouse;
(h) an air return line for removing air from the airlock and greenhouse;
(i) a first air return valve connected to said air return line and disposed within said airlock and outside said greenhouse;
(j) a second air return valve connected to said air return line and disposed within said greenhouse; and
(k) a respiration mask selectively connectable to (1) said first air supply valve and said first air return valve or (2) said second air supply valve and said second air return valve.

8. The apparatus of claim 7, further comprising:
a flexible air supply tube connected to said respiration mask and connectable to one of said first and second air supply valves; and
a flexible air return tube connected to said respiration mask and connectable to one of said first and second air return valves.

9. The apparatus of claim 7, further comprising an air blower connected to said air supply line.

10. The apparatus of claim 7, further comprising a vent blower connected to said air return line.

11. The apparatus of claim 7, further comprising:
a third air supply valve connected to said air supply line and disposed external said airlock and said greenhouse; and
a third air return valve connected to said air return line and disposed external said airlock and said greenhouse, wherein said respiration mask is selectively connectable to (1) said air first air supply valve and said first air return valve, (2) said second air supply valve and said second air return valve, or (3) said third air supply valve and said third air return valve.

\* \* \* \* \*